(12) United States Patent
Busi et al.

(10) Patent No.: US 10,601,537 B2
(45) Date of Patent: Mar. 24, 2020

(54) FAULT PROPAGATION IN SEGMENTED PROTECTION

(71) Applicant: HUAWEI TECHNOLOGIES CO., LTD., Shenzhen (CN)

(72) Inventors: Italo Busi, Segrate (IT); Min Ye, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/100,230

(22) Filed: Aug. 10, 2018

(65) Prior Publication Data

US 2018/0351686 A1 Dec. 6, 2018

Related U.S. Application Data

(63) Continuation of application No. PCT/EP2016/053057, filed on Feb. 12, 2016.

(51) Int. Cl.
*H04J 14/02* (2006.01)
*H04L 12/703* (2013.01)
(Continued)

(52) U.S. Cl.
CPC ........ *H04J 14/0268* (2013.01); *H04J 3/1652* (2013.01); *H04J 14/0273* (2013.01);
(Continued)

(58) Field of Classification Search
None
See application file for complete search history.

(56) References Cited

U.S. PATENT DOCUMENTS

2003/0145246 A1* 7/2003 Suemura ............... H04L 12/437
714/2
2005/0249119 A1 11/2005 Elie-Dit-Cosaque et al.
(Continued)

FOREIGN PATENT DOCUMENTS

CN 1479455 A 3/2004
EP 0881797 A2 12/1998
(Continued)

OTHER PUBLICATIONS

ITU-T G.808.1, Series G: Transmission Systems and Media, Digital Systems and Networks Digital networks—General aspects Generic protection switching—Linear trail and subnetwork protection, May 2014, 74 pages.
(Continued)

*Primary Examiner* — Darren E Wolf
(74) *Attorney, Agent, or Firm* — Kilpatrick Townsend & Stockton LLP

(57) ABSTRACT

The disclosure provides an interconnecting node for interconnecting first and second protected domains, the second protected domain comprising a working path and a protection path for linear protection in a network for traffic forwarding between two end-nodes. The interconnecting node comprises at least one interface for receiving first monitoring information from the first protected domain, a monitoring unit for detecting an isolation condition of the interconnecting node within the first protected domain based on the first monitoring information, and generating second monitoring information to be transmitted to the working path so that a failure in the working path is detectable based on the second monitoring information at a far-end node of the working path. If an isolation condition is detected, the monitoring unit starts transmitting alarm indication information to the working path for suppressing at the far-end
(Continued)

node an alarm reporting regarding a failure in the working path.

17 Claims, 7 Drawing Sheets

(51) Int. Cl.
   *H04L 12/715* (2013.01)
   *H04L 12/707* (2013.01)
   *H04J 3/16* (2006.01)
   *H04L 12/723* (2013.01)
(52) U.S. Cl.
   CPC .............. *H04L 45/04* (2013.01); *H04L 45/24* (2013.01); *H04L 45/28* (2013.01); *H04L 45/50* (2013.01); *H04L 45/22* (2013.01)

(56) References Cited

U.S. PATENT DOCUMENTS

| | | | | |
|---|---|---|---|---|
| 2012/0130959 A1* | 5/2012 | Wu | ........................ | H04L 12/437 707/687 |
| 2014/0169783 A1* | 6/2014 | Surek | ................. | H04B 10/0791 398/10 |
| 2014/0219080 A1* | 8/2014 | Kim | ........................ | H04L 45/22 370/221 |
| 2015/0098317 A1* | 4/2015 | Cheung | ................... | H04L 45/28 370/218 |

FOREIGN PATENT DOCUMENTS

| | | | |
|---|---|---|---|
| EP | 2521310 A1 | 11/2012 | |
| WO | 9911090 A1 | 3/1999 | |

OTHER PUBLICATIONS

ITU-T G.870/Y.1352 Corrigendum 1, Series G: Transmission Systems and Media, Digital Systems and Networks Digital networks—Optical transport networks Series Y: Global Information Infrastructure, Internet Protocol Aspects and Next-Generation Networks Internet protocol aspects—Transport, Terms and definitions for optical transport networks Corrigendum 1, Aug. 2013, 8 pages.
ITU-T G.870/Y.1352, Series G: Transmission Systems and Media, Digital Systems and Networks Digital networks—Optical transport networks Series Y: Global Information Infrastructure, Internet Protocol Aspects and Next-Generation Networks Internet protocol aspects—Transport Terms and definitions for optical transport networks, Oct. 2012, 30 pages.
ITU-T G.8013./Y, 1731, Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Operation, administration and maintenance Operation, administration and maintenance (OAM) functions and mechanisms for Ethernet-based networks, Aug. 2015, 102 pages.
ITU-T G.7710/Y.1701, Series G: Transmission Systems and Media, Digital Systems and Networks Data over Transport—Generic aspects—Transport network control aspects Series Y: Global Information Infrastructure, Internet Protocol Aspects and Next-Generation Networks Internet protocol aspects—Operation, administration and maintenance Common equipment management function requirements, Feb. 2012, 98 pages.
Jessy Rouyer Alcatel-Lucent, Proposed solution for G.8031 support of DNI in the context of MDSP. Shanghai, China, Sep. 1-5, 2014, wd29r1, 11 pages.
Taesik Cheung et al, Proposed approach to support DNI in a Protected Subnetwork protected by linear protection in G. mdsp, Ottawa, Mar. 2-6, 2015, WD13, 12 pages.

Min Ye et al., Further clarification on DNI solution for Ethernet linear protection in G.mdsp, Ottawa, Canada, Mar. 2-6, 2015, WD10, 3 pages.
Editor G.mdsp, Draft new Recommendation ITU-T G.mdsp (latest draft), Jun. 22-Jul. 3, 2015, TD 309r1 (WP 3/15), 19 pages.
Huawei Technologies Co., Ltd., MDSP linear DNI solution analysis on failure cases. COM 15-C 1472-E, Jun. 2014, 8 pages.
ETRI, Interaction between MDSP process supporting linear DNI and DRNI in G.mdsp, COM 15-C 1431-E, Jun. 2015, 12 pages.
ETRI, Proposed mechanism to support linear DNI in G.mdsp. COM 15-C 1429-E, Jun. 2015, 10 pages.
Huawei Technologies Co., Ltd., Proposed DNI solution for Ethernet linear protection in G.mdsp. COM 15-C 0933-E, Nov. 2014, 4 pages.
ITU-T G.873.1, Series G: Transmission Systems and Media, Digital Systems and Networks Digital networks—Optical transport networks Optical transport network (OTN): Linear protection, May 2014, 36 pages.
ITU-T G.873.1 Amendment 1, Series G: Transmission Systems and Media, Digital Systems and Networks Digital networks—Optical transport networks Optical Transport Network (OTN): Linear protection Amendment 1: New Appendix III—Optical layer protection. Dec. 2014, 10 pages.
Draft revised Recommendation ITU-T G.8021 / Y.1341, 201504, 352 pages.
ITU-T G.8021/Y.1341, Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Transport Characteristics of Ethernet transport network equipment functional blocks, Apr. 2015, 328 pages.
ITU-T G.8021/Y.1341 Corrigendum 1, Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Transport Characteristics of Ethernet transport network equipment functional blocks, Aug. 2015, 64 pages.
ITU-T G.8031/Y.1342, Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Transport Ethernet linear protection switching, Jan. 2015, 96 pages.
ITU-T G.8113.1/Y.1372.1 , Series G: Transmission Systems and Media, Digital Systems and Networks Packet over Transport aspects—MPLS over Transport aspects Series Y: Global Information Infrastructure, Internet Protocol Aspects and Next-Generation Networks Internet protocol aspects—Transport Operations, administration and maintenance mechanism for MPLS-TP in packet transport networks, Nov. 2012, 44 pages.
ITU-T G.8113.1/Y.1372.1 Amendment 1, Series G: Transmission Systems and Media, Digital Systems and Networks Packet over Transport aspects—MPLS over Transport aspects Series Y: Global Information Infrastructure, Internet Protocol Aspects and Next-Generation Networks Internet protocol aspects—Transport Operations, administration and maintenance mechanism for MPLS-TP in packet transport networks, Aug. 2013, 16 pages.
ITU-T G.8113.2/Y.1372.2, Series G: Transmission Systems and Media, Digital Systems and Networks Packet over Transport aspects—MPLS over Transport aspects Series Y: Global Information Infrastructure; Internet Protocol Aspects and Next-Generation Networks Internet protocol aspects—Transport Operations, administration and maintenance mechanisms for MPLS-TP networks using the tools defined for MPLS, Aug. 2015, 30 pages.
ITU-T G.8113.2/Y.1372.2, Series G: Transmission Systems and Media, Digital Systems and Networks Packet over Transport aspects—MPLS over Transport aspects Series Y: Global Information Infrastructure, Internet Protocol Aspects and Next-Generation Networks Internet protocol aspects—Transport Operations, administration and maintenance mechanisms for MPLS-TP networks using the tools defined for MPLS, Nov. 2012, 30 pages.

(56) References Cited

OTHER PUBLICATIONS

Editor G.mdsp, Draft new Recommendation ITU-T G.mdsp (latest draft). TD 309r1 (WP 3/15), Jun. 22-Jul. 3, 2015, 19 pages.
Huawei Technologies Co., Ltd., A solution for Ethernet DNI scenario in G.mdsp (SP#4). Wuhan, China, Oct. 19-23, 2015, WD09-21, 10 pages.

* cited by examiner

|   | 1 | 2 | 3 | 4 |
|---|---|---|---|---|
|   | 8 7 6 5 4 3 2 1 | 8 7 6 5 4 3 2 1 | 8 7 6 5 4 3 2 1 | 8 7 6 5 4 3 2 1 |
| 1 | MEL | Version (0) | OpCode (VSM=51) | Flags | TLV Offset |
| 5 | OUI | | | SubOpCode |
| 9 | Sequence Number (0) |
| 13 | MEP ID | |
| 17–57 | MEG ID (48 octets) |
| 61 | | | TxFCf |
| 65 | TxFCf | | RxFCb |
| 69 | RxFCb | | TxFCb |
| 73 | TxFCb | | Reserved (0) |
| 77 | Reserved (0) | | End TLV (0) |

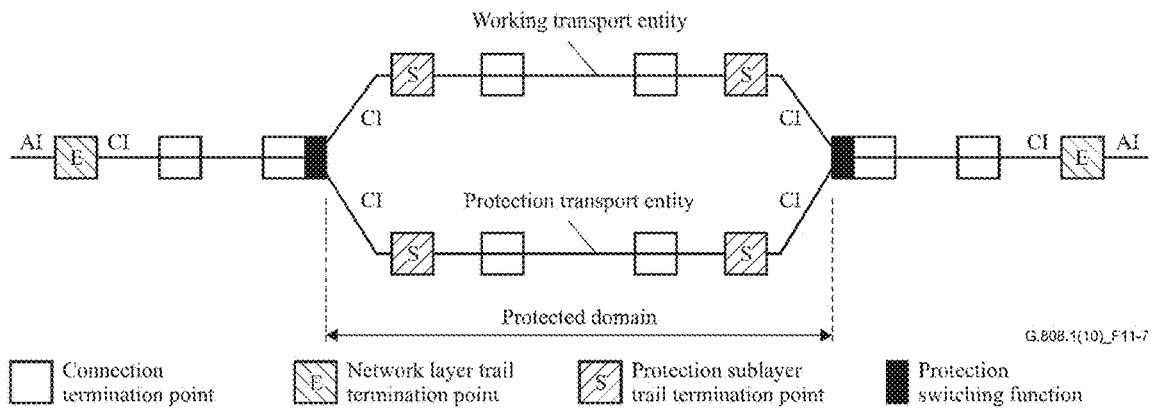
Fig. 11 (state of the art)
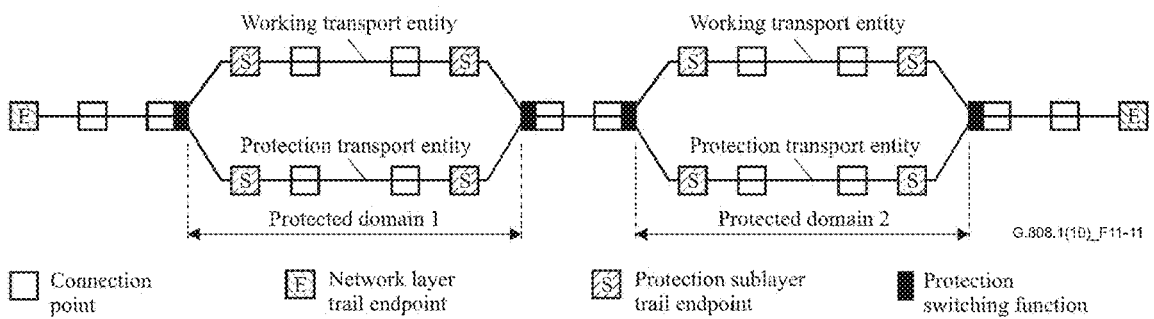
Fig. 12 (state of the art)
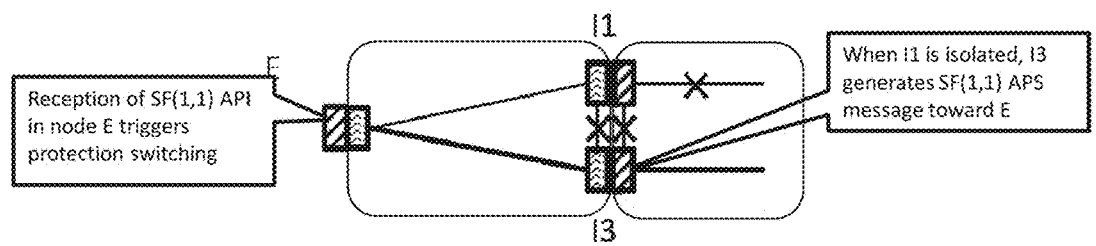
Fig. 13 (state of the art)

FAULT PROPAGATION IN SEGMENTED PROTECTION

CROSS-REFERENCE TO RELATED APPLICATIONS

This application is a continuation of International Patent Application No. PCT/EP2016/053057, filed on Feb. 12, 2016. The disclosure of the aforementioned application is hereby incorporated by reference in its entirety.

TECHNICAL FIELD

The present disclosure generally relates to the field of traffic forwarding between two end-nodes, and specifically relates to the interconnection of protected domains in a network for traffic forwarding between two end-nodes. The present disclosure relates further to an interconnecting node for interconnecting protected domains, and to a method for interconnecting protected domains. Further, technical field of technology addressed by the disclosure covers packet transport, protection switching, packet networks like Ethernet networks or networks based on Multi-Protocol Label Switching-Transport Profile (MPLS-TP), and Time-Division Multiplexing (TDM) technologies like Optical Transport Network (OTN) or Synchronous Digital Hierarchy (SDH).

BACKGROUND

It is known to provide resiliency, i.e. recovering traffic forwarding, in a network using segmented protection with Dual Node Interconnection (DNI) when protected domains are using linear subnetwork connection protection (SNCP) with sublayer monitoring (SNC/S).

Linear protection is a survivability mechanism when there are two possible paths that can be used for traffic forwarding: the working path where traffic is forwarded under normal conditions and the protection path where traffic is forwarded when the working path is not available or on operator's demand. The actual path used for traffic forwarding is commonly referred as the active path while the other path is commonly referred as the standby path.

The linear protection and corresponding architectures are defined in ITU-T Recommendation G.808.1 (May 2014), "Generic protection switching—Linear trail and subnetwork protection" and also in ITU-T Recommendation G.870 (October 2012), "Terms and definitions for optical transport networks". Working, protection, active and standby paths or transport entities are respectively defined in ITU-T Recommendation G.870.

Subnetwork connection protection (SNCP) refers to a protection mechanism that protects a portion of an end-to-end connection, as shown in FIG. 11 according to ITU-T Recommendation G.808.1. The protected domain represents the portion of the end-to-end connection which is protected by the protection mechanism, as defined in ITU-T Recommendation G.870.

Selection of the active and standby paths is performed based on the status of the working and protection paths as well as some operator's commands, as defined in ITU-T Recommendation G.808.1. In normal condition—i.e. no failures or degradations and no contrary operator's commands—the working path is selected as the active path. When a failure is detected on the working path, traffic can be recovered by selecting the protection path as the active one.

It is also possible for an operator to force protection switching actions, selecting the protection path as the active one.

An Automatic Protection Switching (APS) protocol is commonly used to coordinate protection switching actions, i.e. to activate the same path, between the two protection switching functions at the edges of the protected domain. APS protocol information is exchanged through in-band overhead on the protection path. There are multiple alternatives to monitor the status of the working and protection paths.

SNCP with sub-layer monitoring (SNC/S) is an architecture where the working and protection path are monitored using Operations, Administration and Maintenance (OAM) mechanisms between the edges of the protected domain.

OAM mechanisms refer to set of mechanism to monitor the status of a path. For the purpose of protection switching, OAM mechanisms are capable to detect whether there is a failure—traffic cannot be forwarded—or a degradation—traffic can be forwarded but the quality of the delivered traffic is below the agreed quality of service.

OAM mechanisms can monitor the status of the whole end-to-end connection as well as the status of a portion of the connection. In the latter case, the term tandem connection is usually indicating the portion of the connection being monitored and sublayer monitoring usually refers to the mechanism used to monitor the portion of the connection. The entity which is monitored by OAM—being either the end-to-end connection or the tandem connection—is usually called maintenance entity group (MEG). In the case of SNC/S, the MEG contains one maintenance entity so that, in the context of the present disclosure, the term maintenance entity (ME) in fact refers to MEG.

In case of SNC/S, two maintenance entities are used to monitor the status of the working and protection paths.

OAM mechanisms operate in the overhead of the specific transport technology. For TDM technologies like SDH or OTN, some bytes in the TDM/OTN frame overhead are used. For packet technologies like Ethernet or MPLS-TP, some overhead packets, defined as OAM packets, are used. The OAM packets used in Ethernet networks are defined in ITU-T Recommendation G.8013/Y.1731 (August 2015), "OAM functions and mechanisms for Ethernet-based networks". The OpCode field in a CCM frame is used to indicate the type of OAM packet, e.g. Continuity Check Message (CCM) or Alarm Indication Signal (AIS).

Failures conditions of a maintenance entity can be detected using Continuity Check Message (CCM) OAM packets defined in ITU-T Recommendation G.8013/Y.1731, wherein in has to be noted that similar mechanisms are defined for other packet technologies like MPLS-TP. These keep-alive packets are continuously and periodically sent by one edge of the maintenance entity to the other edge of the maintenance entity. Lack of receipt of expected CCM messages is an indication that there is a failure: when three expected CCM packets in a row are lost, a Loss of Continuity defect (dLOC) is detected.

In case of SNC/S, detection of dLOC is an indication that the working or the protection path has failed and would immediately trigger protection switching actions. For example, when dLOC is detected on the working path in normal condition, protection switching actions will select the protection path as the active one.

In addition to trigger protection switching actions, detection of dLOC can also result in an alarm being sent to the operator to notify the fault condition, triggering fault location detection—i.e. identification of which is the fault root cause—and fault repair—e.g. replacement or fix of the failed component—actions.

However, reporting of an alarm when dLOC is detected is "filtered" to avoid reporting spurious or flooding the operator with secondary alarms. The process of filtering defects toward alarms is defined in ITU-T Recommendation G.7710 (February 2012), "Common equipment management function requirements". In order to avoid spurious alarms, alarm reporting is hold-off for some time after defect detection: the standard holding time is 3.5 seconds as defined in ITU-T Recommendation G.7710.

In order to avoid flooding the operator with secondary alarms, Alarm Indication Signal (AIS) OAM packets have been defined in ITU-T Recommendation G.8013/11731. When an intermediate node detects a failure in the server layer or sub-layer termination, it generates AIS to suppress alarm reporting for dLOC since the primary alarm is the server layer or sub-layer failure detected and reported by such intermediate node.

For providing segmented protection, since SNC/S protects a portion of a connection, it is possible to use cascaded protected subnetworks as shown in FIG. 12 according to ITU-T Recommendation G.808.1.

The network shown in FIG. 12 is capable to protect against multiple faults—i.e. one fault per each protected subnetwork—but it cannot recover against any fault at the interconnection between adjacent subnetworks. The protection mechanisms in each protected domain operate independently from each other.

In order to provide resiliency against the failure at the interconnection between adjacent subnetworks, Dual Node Interconnection (DNI) architectures are defined in ITU-T Recommendation G.808.1. The points of interconnection are usually called interconnecting nodes. These architectures, with or without DNI, are usually called segmented protection.

With DNI, the protection mechanisms in each protected domain usually operate independently from each other; however some interactions between the protection mechanisms of adjacent protected subnetworks are needed to protect against interconnection node failure or isolation conditions. It is worth noting that segmented protection architectures do not require using the same protection mechanism (e.g., SNC/S) in different protected domains. It only requires that protected domains are not overlapping.

FIG. 13 shows a system according to document WD09-21, "A solution for Ethernet DNI scenario in G.mdsp (SP #4)", Huawei, October 2015 proposing a solution for supporting DNI with SNC/S linear protection.

The system of FIG. 13 supports traffic forwarding an end-node E and a further end-node. Two protected domains (called protected subnetwork and interconnected domain) are shown, each protected domain comprising a working path and a protection path for linear protection. An interconnecting node I1 interconnects the working paths of the protected domains, while a peer interconnecting node I3 interconnects their protection paths. The interconnecting node I1 and the peer interconnecting node I3 are connected by vertical paths.

The crossed working path indicates that the working path fails, and the crossed vertical paths indicate that the vertical paths fail: in this situation, interconnecting node I1 is isolated within the protected domain (called also interconnected domain). When the interconnecting node I1 is isolated, the peer interconnecting node I3 transmits an SF(1,1) APS message to the end-node E for triggering protection switching in the end-node E. The reception of the SF(1,1) APS message by the end-node E then triggers the protection switching.

In the scenario of FIG. 13, the peer interconnecting node I3 detects the vertical link failure, and is informed about the isolation of the interconnecting node I1 through the interconnected domain.

However, there may be some cases where the peer interconnected node I3 is not able to be informed of the I1 node isolation: for example when there is a unidirectional failure detected by the interconnecting node I1 but no protocol, e.g. Distributed Resilient Network Interconnect (DRNI), is available in the interconnecting node I1 to inform the peer interconnected node I3 about this condition.

Moreover, a lack of receipt of expected CCM messages at e.g. the node E may result in false primary alarms being reported by node E to the operator. As a consequence the operator will trigger useless and expensive fault diagnostic procedures to discover that there is no fault to repair within this protected domain between node E and interconnecting node I1.

Moreover, the state of the art does not address traffic forwarding where cascading of protection switching events may happen across multiple protected domains.

SUMMARY

Having recognized the above-mentioned disadvantages and problems, the present disclosure aims to improve the state of the art. In particular, the object of the present disclosure is to provide an interconnecting node and a method for an improved interconnection of protected domains. The present disclosure particularly intends to improve the interconnection of protected domains so as to avoid reporting false alarms.

The above-mentioned object of the present disclosure is achieved by the solution provided in the enclosed independent claims. Advantageous implementations of the present disclosure are further defined in the respective dependent claims.

A first aspect of the present disclosure provides an interconnecting node for interconnecting a first and a second protected domain. The second protected domain comprises a working path and a protection path for linear protection in a network for traffic forwarding between two end-nodes. The interconnecting node comprises at least one interface adapted to receive first monitoring information from the first protected domain. The interconnecting node comprises a monitoring unit adapted to detect an isolation condition of the interconnecting node within the first protected domain based on the first monitoring information. The monitoring unit is adapted to generate second monitoring information. The interface is adapted to transmit the second monitoring information to the working path of the second protected domain so that a failure in the working path is detectable based on the second monitoring information at a far-end node of the working path. When an isolation condition of the interconnecting node within the first protected domain is detected, the monitoring unit is adapted to start a transmission of alarm indication information to the working path of the second protected domain for suppressing at the far-end node an alarm reporting regarding a failure in the working path of the second protected domain.

Thereby, when the interconnecting node detects its isolation within the first protected domain, it will transmit the alarm indication information that indicates to the far-end node of the second protected domain not to report alarms.

The far-end node then receives this alarm indication information and understands this alarm indication information as a command to suppress an alarm reporting e.g. to an operator. Such an alarm reporting by the far-end node would be understood by the operator as a notification of a fault condition with the second protected domain, and would result in useless actions of the operator within the second protected domain, like fault detection actions and fault repair actions within said second protected domain. The disclosure is thereby advantageous in that the far-end node will not send unnecessary alarms to the operator, thus avoiding unnecessary work of the operator in the second protected domain.

Particularly, the second monitoring information is sent to the far-end node of the working path as an indication for the far-end node to trigger protection switching, i.e. to activate the protection path of the second protected domain and to select the working path as the standby path.

Particularly, when the network is a packet network like e.g. Ethernet, the first monitoring information and second monitoring information may be first and second keep-alive information transmitted by means of Continuity Check Message (CCM) packet(s). The interface may be adapted to regularly, i.e. at regular time intervals, receive the first keep-alive information from the first protected domain, wherein the monitoring unit may be adapted to detect an isolation condition of the interconnecting node within the first protected domain in case of an interruption in the regular reception of the first keep-alive information at the interconnecting node. According to this configuration detection of an isolation condition based on the first monitoring information corresponds to detecting the isolation condition based on an interruption or the regular reception of the first monitoring information.

Further, the interface may be adapted to regularly, i.e. at regular time intervals, transmit the second keep-alive information to the working path, so that in case of an interruption in a regular reception of the second keep-alive information, the far-end node of the second protected domain may trigger protection switching, i.e. select the protection path of the second protected domain as active path and the working path as standby path. Alternatively, such as in the case of OTN networks, in case of a failure the interface may be configured to send the first monitoring information for indicating that a failure occurred. The first monitoring information may for instance indicate the type of failure occurred. In an OTN network the first monitoring information may be transmitted in the overhead of the OTN frame.

In a first implementation form of the interconnecting node according to the first aspect, when an isolation condition of the interconnecting node within the first protected domain is detected, the monitoring unit is adapted to concurrently prevent the transmission of the second monitoring information to the working path of the second protected domain, and start the transmission of alarm indication information to the working path. In an Ethernet network, this may be achieved by stopping CCM transmission and concurrently starting transmission of alarm indication information (such as for example AIS information). In the case of an OTN network, this may be achieved by replacing the monitoring information usually transmitted in the overhead of the OTN frame by alarm indication information. In this case the above described replacement corresponds to the concurrent stop of first monitoring information and start of alarm indication information.

Thereby, preventing the transmission of the second monitoring information to the working path will result in the far-end node of the working path being able to trigger protection switching at the far-end node. Also, by concurrently starting the transmission of alarm indication information to the working path, it may be advantageously ensured that the far-end node will not send unnecessary alarms to the operator.

In a further implementation form of the interconnecting node according to the first aspect, the first protected domain comprises a given working path and a given protection path for linear protection. The monitoring unit is adapted to detect that the interconnecting node is isolated within the first protected domain if a failure in the given working path of the first protected domain and a failure of a vertical path are detected, the vertical path connecting the interconnecting node with a second interconnecting node in the first protected domain.

Thereby, the disclosure is advantageous in that unnecessary alarms are avoided even in case of a failure of a vertical path between two interconnecting nodes provided for interconnecting respectively two working paths and two protection paths.

Particularly, the interconnecting node may comprise a further interface adapted to be connected via at least one vertical path to the second interconnecting node, the second interconnecting node being adapted to interconnect said given protection path of the first protected domain and said protection path of the second protected domain. The monitoring unit is adapted to start the transmission of alarm indication information (AIS) to the working path of the second protected domain in case a failure in said given working path of the first protected domain is detected and in case a failure in the vertical path is detected.

In a further implementation form of the interconnecting node according to the first aspect, the far-end node of the second working path is one of the two end-nodes. Thereby, the disclosure is advantageous in that the end-node of the traffic forwarding will not send unnecessary alarms to the operator.

In a further implementation form of the interconnecting node according to the first aspect, when an isolation condition of the interconnecting node within the first protected domain is detected, the monitoring unit is adapted to generate and start a transmission of modified second monitoring information to the working path of the second protected domain, said modified second monitoring information indicating that a detected failure on the working path is caused by fault propagation of a failure in the first protected domain.

Thereby, the far-end node of the second protected domain may understand when protection switching within the second protected domain is triggered by a failure on the working path within that second protection domain or by the cascading actions triggered by a fault within an upstream protected domain like the first protected domain. The far-end node may use this information just for reporting/logging purposes or, if it is interconnected to another downstream protected domain, to decide whether or not to further cascade protection switching actions toward that downstream protected domain.

Particularly, the far-end node of the second protected domain may understand that protection switching within the second protected domain is triggered by a failure on the working path within that second protection domain based on the second monitoring information. For example, the far-end node of the second protected domain may understand that the protection switching is triggered by a failure on the working path within that second protection domain in case of an interruption in a regular reception of the second keep-alive information.

Particularly, the far-end node of the second protected domain may understand that protection switching within the second protected domain is triggered by a failure on the working path within the first protected domain based on the modified second monitoring information, i.e. based on the reception of the modified second monitoring information.

In a further implementation form of the interconnecting node according to the first aspect, when the isolation condition of the interconnecting node within the first protected domain is detected, the monitoring unit is adapted to concurrently start the transmission of the modified second monitoring information to the working path of the second protected domain, and start the transmission of alarm indication information to the working path of the second protected domain.

Thereby, preventing the transmission of the second monitoring information to the working path will result in the far-end node of the working path being able to trigger protection switching at the far-end node. Also, by concurrently starting the transmission of alarm indication information to the working path, it may be advantageously ensured that the far-end node will not send unnecessary alarms to the operator. Also, by concurrently sending modified second monitoring information, it may be advantageously ensured that the far-end node may or may not further cascade protection switching actions.

In a further implementation form of the interconnecting node according to the first aspect, the far-end node of the second working path is connected to a further protected domain used for traffic forwarding between the two end-nodes.

Thereby, unnecessary alarms may be avoided for systems comprising any number of protected domains. The disclosure is advantageous in that, in case of a failure in the first protected domain, a fault propagation of this failure to other downstream protected domains will not cause unnecessary alarms. Also cascading actions across multiple non-adjacent protected domains can be controlled.

In a further implementation form of the interconnecting node according to the first aspect, the interface is adapted to further receive modified first monitoring information from the first protected domain, and the monitoring unit is adapted to distinguish between the reception of the first monitoring information and of the modified first monitoring information. When the modified first monitoring information is received, the monitoring unit is adapted to detect that a failure is located in a further working path interconnected with the first protected domain.

Thereby, the interconnecting node may understand when protection switching within the first protected domain is triggered by a failure on the working path within that first protection domain or by the cascading actions triggered by a fault within an upstream protected domain located upstream of the first protected domain. The interconnecting node may use this information just for reporting/logging purposes or, since it is interconnected to the second protected domain, to decide whether or not to further cascade protection switching actions toward that second protected domain.

In a further implementation form of the interconnecting node according to the first aspect, the network is a packet network, advantageously an Ethernet network or a network based on Multi-Protocol Label Switching-Transport Profile (MPLS-TP), the first monitoring information and second monitoring information are respectively transmitted by means of Continuity Check Message (CCM) Operations, Administration and Maintenance (OAM) packet(s), i.e. CCM-OAM packet(s). The alarm indication information (AIS) is transmitted as Alarm Indication Signal (AIS) OAM packet(s). This is a particular implementation of the disclosure.

In a further implementation form of the interconnecting node according to the first aspect, the network is a Time-Division Multiplexing (TDM) network, advantageously Optical Transport Network (OTN) or Synchronous Digital Hierarchy (SDH). The first monitoring information, the second monitoring information and the alarm indication information (AIS) are respectively transmitted by means of specific bytes in an overhead of a TDM frame. This is another particular implementation of the disclosure.

The functions of the interconnecting node according to the first aspect and any functions of any of its implementation forms may be performed by a processor or a computer, and any of their means may be implemented as software and/or hardware in such a processor or computer.

A second aspect of the present disclosure provides a system for segmented protection between two end-nodes. The system comprises the two end-nodes, a plurality of N interconnecting nodes according to the first aspect of the disclosure, N being a positive integer, and a plurality of protected domains that are serially interconnected between the two end-nodes.

Each interconnecting node interconnects two of the plurality of protected domains. In other implementations, a pair of interconnecting nodes, such as for instance a first and a second interconnecting nodes, may be used for interconnecting two of the plurality of interconnected domains. The first and second interconnecting nodes in the pair may be interconnected through a vertical path, the second interconnecting node being referred to in the following as peer interconnecting node.

A third aspect of the present disclosure provides a method for interconnecting via an interconnecting node a first and a second protected domain, the second protected domain comprising a working path and a protection path for linear protection in a network for traffic forwarding between two end-nodes. The interconnecting node comprises at least one interface for receiving first monitoring information from the first protected domain, and a monitoring unit for detecting an isolation condition of the interconnecting node within the first protected domain based on the first monitoring information, and for generating second monitoring information frame header. When the interface transmits the second monitoring information to the working path of the second protected domain, a failure in the working path is detectable based on the second monitoring information at a far-end node of the working path. When an isolation condition of the interconnecting node within the first protected domain is detected, the monitoring unit starts a transmission of alarm indication information to the working path of the second protected domain for suppressing at the far-end node an alarm reporting regarding a failure in the working path of the second protected domain.

Further features or implementations of the method according to the third aspect of the disclosure can perform the functionality of the interconnecting node according to the first aspect of the disclosure and its different implementation forms.

The methods according to the third aspect or any of its implementation forms may be performed by a processor or a computer.

A fourth aspect of the present disclosure provides a computer program having a program code for performing the method according to the third aspect of the disclosure when the computer program runs on a computing device.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings, in which:

FIG. 11 shows a system with a protected domain according to the state of the art.

FIG. 12 shows a system with cascaded protected domains according to the state of the art.

FIG. 13 shows a system with Dual Node Interconnection (DNI) according to the state of the art.

DESCRIPTION OF EMBODIMENTS

Figure 1:
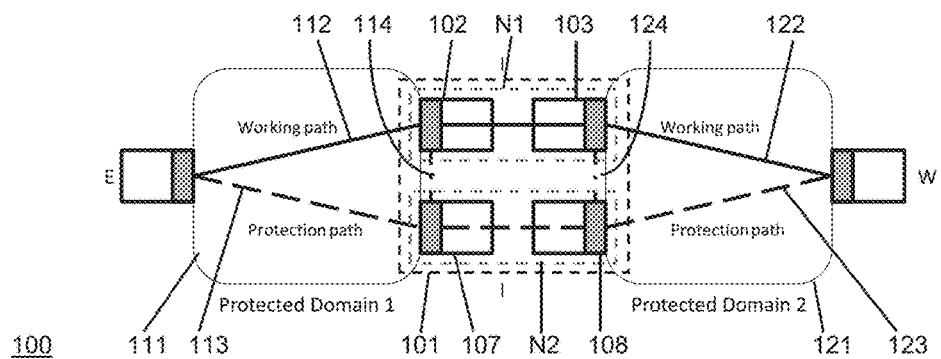
FIG. 1 shows a system according to a first embodiment of the present disclosure.

FIG. 1 shows a system 100 according to a first embodiment of the present disclosure.

Particularly, FIG. 1 shows an interconnecting node N1 for interconnecting a first protected domain 111 and a second protected domain 121. The second protected domain 121 comprises a working path 122 and a protection path 123 for linear protection in a network for traffic forwarding between two end-nodes. In this configuration, the end nodes E and W between which the interconnecting node N1 is interposed are far-end nodes for N1 in the first and second protected domain respectively. In other configurations including more than two protected domains, the far-end nodes may also be interconnecting nodes as will be described in more detail in the following with reference to FIGS. 9 and 10. An end node is a node located at the extremity of the domain of interest, where segmented protection is implemented. The end node may have the same features of an interconnecting node or may be a different structure depending on the node and network configuration.

Figure 4:
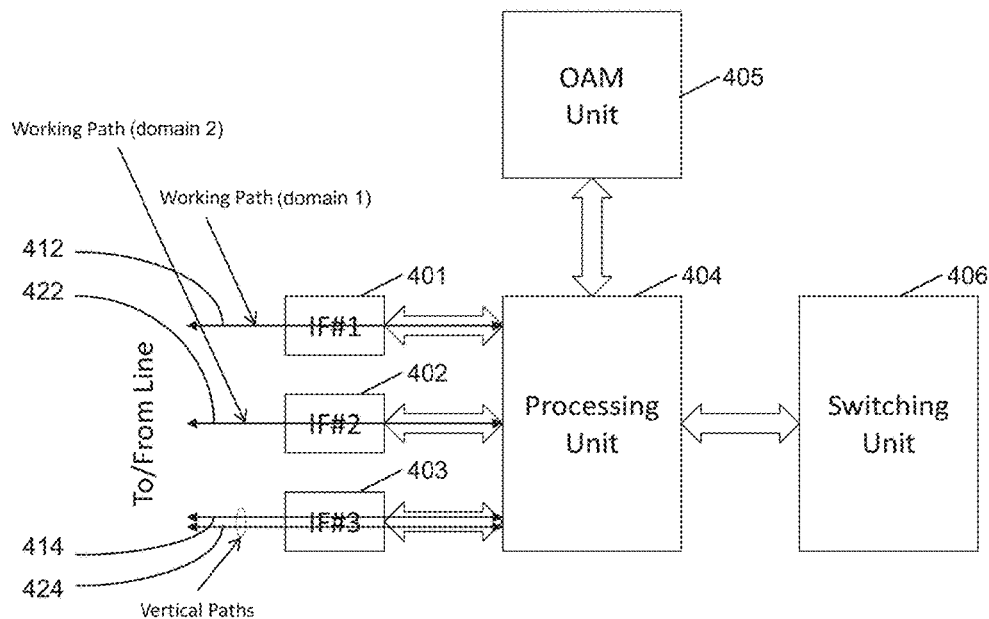
FIG. 4 shows an interconnecting node according to an embodiment of the present disclosure.

The interconnecting node N1 comprises at least one interface 401, 402 shown in FIG. 4 adapted to receive first monitoring information from the first protected domain 111.

The interconnecting node N1 comprises a monitoring unit 405 shown in FIG. 4 adapted to detect an isolation condition of the interconnecting node N1 within the first protected domain 111 based on the first monitoring information, and to generate second monitoring information.

The interface 401, 402 of the interconnecting node N1 is adapted to transmit the second monitoring information to the working path 122 of the second protected domain 121 so that a failure in the working path 122 is detectable based on the second monitoring information at a far-end node W of the working path 122.

When an isolation condition of the interconnecting node N1 within the first protected domain 111 is detected, the monitoring unit 405 is adapted to concurrently prevent the transmission of the second monitoring information and to start a transmission of alarm indication information (AIS) to the working path 122 of the second protected domain 121 for suppressing at the far-end node W an alarm reporting regarding a failure in the working path 122 of the second protected domain 121.

Particularly, the first protected domain 111 shown in FIG. 1 may comprise a first working path 112 and a first protection path 113 for linear protection. Alternatively, the first protected domain may not use linear protection and thus have a different structure. The inventive interconnecting node can be connected to a first domain having any kind of protection known in the art. According to the different protection, such as for instance a ring protection, implemented in the first domain the interconnecting node will use a corresponding protocol to communicate with the end node of the first domain.

Particularly, the network may be a packet network, advantageously an Ethernet network or a network based on Multi-Protocol Label Switching-Transport Profile (MPLS-TP). The first monitoring information and second monitoring information may then be respectively transmitted by means of CCM OAM packet(s). The alarm indication information (AIS) may be transmitted as AIS OAM packet(s).

Particularly, the first protected domain 111 and the second protected domain 121 are interconnected by means of a pair 101 of nodes comprising the interconnecting node N1 and a second interconnecting node N2. Particularly, the interconnecting node N1 and a second interconnecting node N2 are connected by means of at least a vertical path. The second interconnecting node in this embodiment may also be indicated as peer interconnecting node. In the embodiment of FIG. 1, they are connected by means of a first vertical path 114 and a second vertical path 124. The interconnecting node N1 comprises an end node 102 of the working path 112 of the first protected domain 111, and an end node 103 of the working path 122 of the second protected domain 121, while the second interconnecting node N2 comprises an end node 107 of the protection path 113 of the first protected domain 111, and an end node 108 of the protection path 123 of the second protected domain 121. The first vertical path 114 connects the respective end nodes 102 and 107 of the first protected domain 111, while the second vertical path 124 connects the respective end nodes 103 and 108 of the second protected domain 121.

Figure 2:
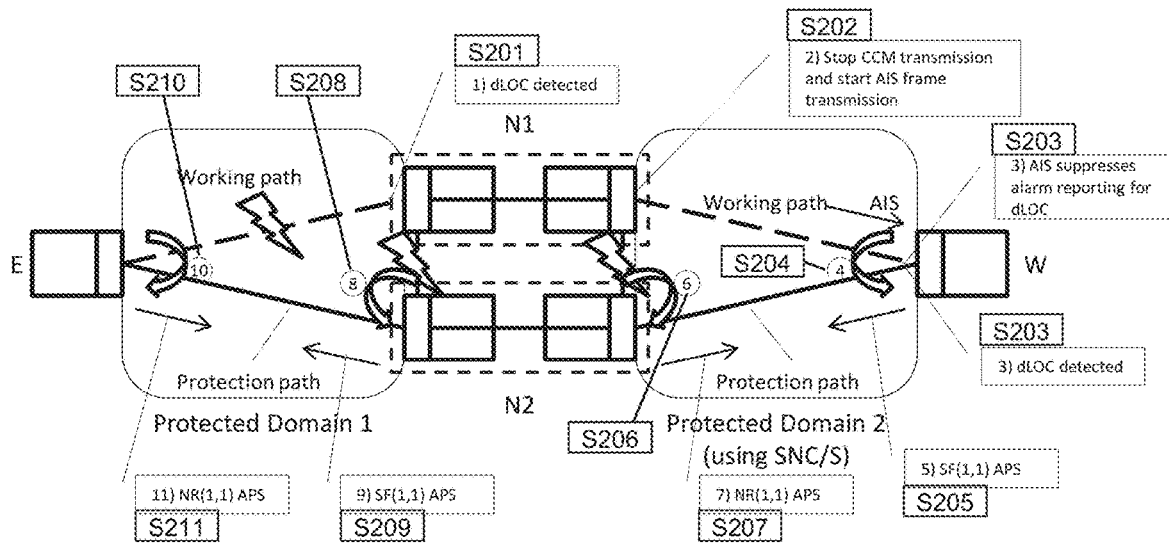
FIG. 2 shows a first scenario of the system according to the first embodiment of the present disclosure.

FIG. 2 shows a first failure scenario of the system according to the first embodiment of the present disclosure.

In a step S201 according to the disclosure, the interconnecting node N1, i.e. its monitoring unit 405, is adapted to detect an isolation condition of the interconnecting node N1 within the first protected domain 111 based on the first monitoring information.

In a step S202, when an isolation condition of the interconnecting node N1 within the first protected domain 111 is detected, the interconnecting node N1, i.e. its monitoring unit 405, is adapted to concurrently induce a detection of a failure by the far-end node of the second protected domain, which in this embodiment corresponds to the end node W, and inhibit the triggering of an alarm. In an Ethernet network for instance this can be achieved by preventing the transmission of the second monitoring information and to start a transmission of alarm indication information to the working path 122 of the second protected domain 121.

In case of a different network environment, such as an OTN network, the above can be achieved by replacing the monitoring information by an alarm indication information. Specifically, the alarm indication information may be transmitted to the far-end node in the overhead of an OTN frame in the place of the monitoring information used for indicating to the far-end node that a failure occurred. In this case, reception by the far-end node of the modified OTN frame including the alarm indication information will be interpreted as an indication of a failure in the first protected domain and concurrent request of suppression of an alarm reporting.

The stop of transmission of monitoring information and concurrent transmission of alarm indication information with reference to the implementation described herein has to be intended both (1) stopping transmission of the CCM or similar frames and concurrent transmission of alarm indication information (in packet networks) and (2) replacement of monitoring information in an OTN or similar frame with alarm indication information in case of OTN or similar networks.

In a step S203, the far-end node W of the second protected domain 121 detects a defect, as if the second working path was failed, due to the not reception of the second monitoring information, and suppresses, as a response to the reception of the alarm indication information, an alarm reporting regarding a failure in the working path 122 of the second protected domain 121.

Particularly, FIG. 2 shows an example of the implementation of the disclosure as an Ethernet network where both the first and the second domains are linear protected, for example the first and second domain are SNC/S protected. Accordingly, segmented protection is deployed for interconnecting the two SNC/S protected domains 111, 121. In this case, when the interconnecting node N1 detects to be isolated within the protected domain 111, it should trigger protection switching at the far-end node W of protected domain 121. In such a configuration, a failure is detected by the interconnecting node N1 when the interconnecting node N1 detects a dLOC defect on the working line in the first protected domain. Clearly in case of a different protection scheme for the first protected domain, the failure in the first protected domain will be detected according to a different protocol. Implementation of failure detection in a nonlinear protected domain will not be discussed in the following, but it will be clear that the disclosure is not limited to a configuration in which the first domain is linearly protected.

For simplicity purposes, this embodiment assumes that the horizontal paths between the protected domains 111, 121 within the two interconnected node N1, N2, i.e. the horizontal path between nodes 102 and 103 and the horizontal path between nodes 107 and 108, are always active paths when faults are detected on the vertical paths 114, 124 between the two interconnected node N1, N2. The disclosure may work even if these paths are activated based on the known information about interconnecting nodes isolation conditions.

The working path failure can be either uni-directional or bi-directional while the vertical path failures are assumed to be all bi-directional. This embodiment assumes that SNC/S DNI within both protected domains is implemented according to document WD09-21, "A solution for Ethernet DNI scenario in G.mdsp (SP #4)", Huawei, October 2015.

Since the vertical paths between the two interconnected nodes N1, N2 are failed, the second interconnected node N2 enables transmission of CCM and APS frames on both the protection paths.

If the working path failure is unidirectional in the direction from interconnected node N1 to end-node E, end-node E can trigger protection switching within the first protected domain 111 and inform the second interconnected node N2, via APS message exchange, that interconnected node N1 is isolated within protected domain 111. Cascading of protection switching toward protected domain 121 could be achieved according to the prior art.

If the working path failure is unidirectional in the direction from end-node E to interconnected node N1, protection switching actions are triggered as depicted in FIG. 2.

In step S201, interconnecting node N1 detects dLOC on the working path 112 of the first protected domain 111. This means that interconnecting node N1 detects failure within the first protected domain 111. The dLOC detection is an example of failure detection in that the interconnecting node N1 detects a stop in CCM transmission between E and N1, i.e. detects an interruption in the regular reception of the CCM transmission from end-node E.

It can be noted that only interconnecting node N1 can understand, based on the detected dLOC on the vertical path 114 and on the working path 112 within the first protected domain 111, that it is isolated within the first protected domain 111. Second interconnecting node N2 has no knowledge of interconnecting node N1 isolation condition.

In step S202, interconnecting node N1 stops CCM transmission and starts AIS transmission toward far-end node W on the working path 122 within the second protected domain 121. The start of AIS transmission is an example of the transmission start of alarm indication information according to the present disclosure.

In step S203, far-end node W detects dLOC on the working path 122, within the second protected domain 121, but the reception of AIS frames advantageously suppresses alarm reporting.

In step S204, far-end node W triggers protection switching within the second protected domain 121.

In step S205, far-end node W sends an SF(1,1) APS message to node N2. It can be noted that second interconnecting node N2 thinks, based on the detected dLOC on the vertical path 124 within second protected domain 121 and on the received SF(1,1) APS message, that interconnecting node N1 is isolated within the second protected domain 121.

The SF(1,1) indicates an APS message, as defined in the ITU-T Recommendation G.8031/11342 (June 2011), section 11.1, where the Request/State field is set to SF (Signal Fail for working, 1011) as defined in table 11-1. The argument (1,1) indicates that the "Requested Signal" and "Bridged Signal" fields (see ITU-T Recommendation G.8031/11342 (January 2015), FIGS. 11-1 and 11-2 in section 11.1) are set to 1.

In step S206, second interconnecting node N2 triggers protection switching within the second protected domain 121.

In step S207, second interconnecting node N2 sends NR(1,1) APS messages to far-end node W. The NR(1,1) indicates an APS message, as defined in the ITU-T Recommendation G.8031/11342 (June 2011), section 11.1, where the Request/State field is set to NR (No Request, 0000) as defined in table 11-1. The argument (1,1) indicate that the "Requested Signal" and "Bridged Signal" fields in APS-specific information (see ITU-T Recommendation G.8031/11342 (January 2015), FIGS. 11-1 and 11-2 in section 11.1) are set to 1.

In step S208, since the second interconnecting node N2 thinks that interconnecting node N1 is isolated within the second protected domain 121, it also triggers protection switching within the first protected domain 111.

In step S209, second interconnecting node N2 sends SF(1,1) APS messages to node E.

In step S210, node E triggers protection switching within the first protected domain 111.

In step S211, node E sends NR(1,1) APS messages to the second interconnecting node N2.

As a result, the traffic between the end-nodes E and W is fully recovered through the path E-N2-W.

Figure 3:
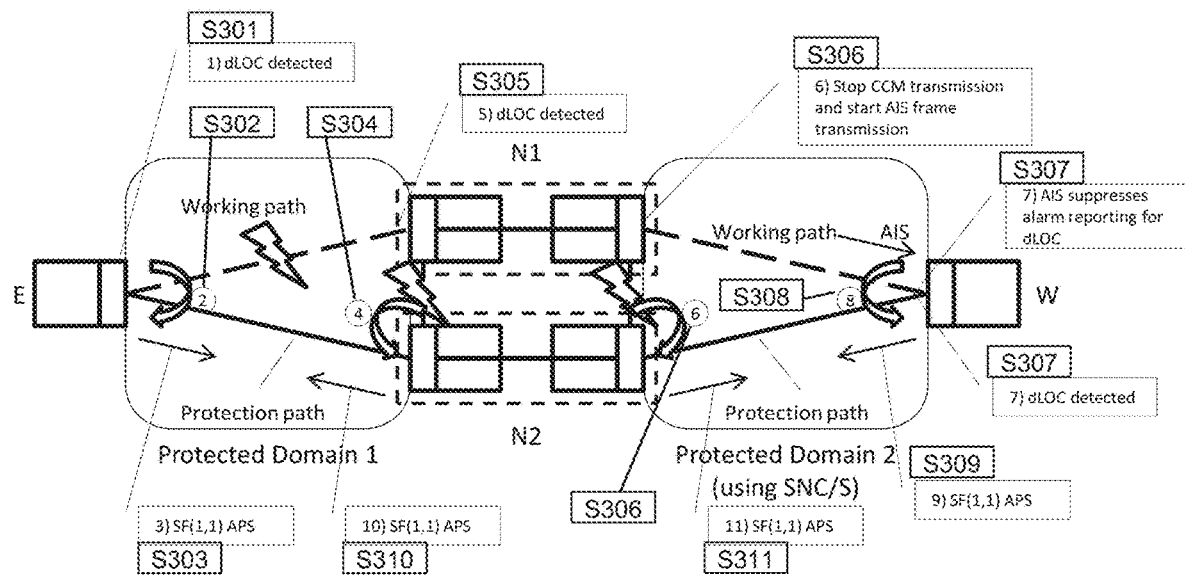
FIG. 3 shows a second scenario of the system according to the first embodiment of the present disclosure.

FIG. 3 shows a second failure scenario of the system according to the first embodiment of the present disclosure.

If the working path failure is bidirectional between the end-node E and the interconnecting node N1, the nodes E, N1 and N2 cannot distinguish this case from the unidirectional failures cases they can address. Protection switching actions are triggered by concurrent actions initiated by end-node E and interconnecting node N1 triggered by the detection of the failure on their receive side, as depicted in FIG. 3.

In step S301, the end-node E detects dLOC on the working path 112.

In step S302, the end-node E triggers protection switching within the first protected domain 111.

In step S303, the end-node E sends SF(1,1) APS messages to the second interconnecting node N2. It can be noted that the second interconnecting node N2 knows, based on the detected dLOC on the vertical path 114 within the first protected domain 111 and the received SF(1,1) APS message, that the interconnecting node N1 is isolated within the first protected domain 111.

In step S304, interconnecting node N2 triggers protection switching within the first protected domain 111. It can be noted that the steps S301 to S304 are the same steps that end-node E and second interconnecting node N2 would take when the failure on the working path 112 is unidirectional in the direction from interconnecting node N1 to end-node E.

In step S305, interconnecting node N1 detects dLOC on the working path 112 of the first protected domain 111.

In step S306, interconnecting node N1 stops CCM transmission towards the second protected domain 121 and starts AIS transmission toward the far-end node W on the working path 122 within the second protected domain 121.

In step S307, the far-end node W detects dLOC on the working path 122 but, similarly to step S203 of FIG. 2, the reception of AIS frames advantageously suppresses alarm reporting.

In step S308, the far-end node W triggers protection switching within the protected domain 121.

In step S309, the far-end node W sends SF(1,1) APS message to the second interconnecting node N2. It can be noted that the steps S305 to S309 are the same as the steps S201 to S205 according to FIG. 2 when the failure on the working path 112 is unidirectional in the direction from the end-node E to the interconnecting node N1.

In step S310, since the second interconnecting node N2 thinks that the interconnecting node N1 is isolated within the second protected domain 121, it will generate SF(1,1) APS messages toward end-node E, similarly to step S209 in FIG. 2 according to the case of unidirectional path failure in the direction from end-node E to interconnecting node N1.

In step S311, since the second interconnecting node N2 knows that the interconnecting node N1 is isolated within the first protected domain 111, it will generate SF(1,1) APS messages toward node W, similarly to the case of unidirectional path failure in the direction from the interconnecting node N1 to the node E.

Figure 9:
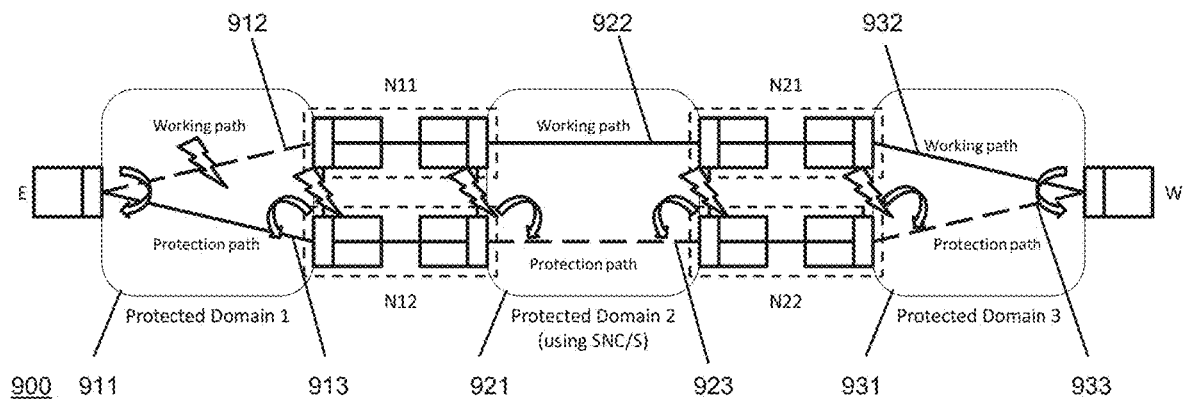
FIG. 9 shows a first scenario of a system according to a second embodiment of the present disclosure.

FIG. 9 shows a first scenario of a system 900 according to a second embodiment of the present disclosure.

The system 900 comprises two interconnecting nodes N11, N21 according to the present disclosure. The structure and functioning of the interconnecting nodes N11, N21 are advantageously the same as for interconnecting node N1 of the first embodiment. The system 900 comprises two end-nodes E, W, the two interconnecting nodes N11, N21, and three protected domains 911, 921, 931 that are serially interconnected between the two end-nodes E, W. The interconnecting node N11 interconnects the first and second protected domains 911, 921, while the interconnecting node N21 interconnects the second and third protected domains 921, 931. The interconnecting node N21 is located in the second protected domain downstream from the point of view of N11 at the end of the second protected domain. In this document an interconnecting node or an end node located at the end of a protected domain and directly connected through a working path with the interconnecting node N11 will be called far-end node. Similarly, node N11 can be seen as a far-end node in the second protected domain from the point of view of the interconnecting node N21.

Advantageously, the interconnecting node N11 interconnects respective the working paths 912, 922 of the two protected domains 911, 921, while the interconnecting node N21 interconnects the working paths 922, 932 of the two protected domains 921, 931. Further on, peer interconnecting nodes N12, N22 are responsible for interconnecting the protection paths 913, 923, 933 of the protected domains 911, 921, 931.

The scenario of FIG. 9 is similar to the scenario of FIG. 2 in that the interconnecting node N11 is isolated within the protected domain 911. Advantageously, the interconnecting node N11 detects such an isolation condition within the protected domain 911 by detecting a failure, e.g. dLOC, in the working path 912 of and a failure of a vertical path between interconnecting node N11 and peer interconnecting node N12. We focus in this example on a case where both vertical paths between interconnecting node N11 and peer interconnecting node N12 within both protected domains 911, 921 present a failure. The scenario of FIG. 9 differs from the scenario of FIG. 2 in that also both vertical paths between interconnecting node N21 and peer interconnecting node N22 within both protected domains 921, 931 present a failure.

Similarly to the interconnecting node N1 of the first embodiment, the interconnecting node N11 comprises:
- at least one interface 401, 402 adapted to receive first monitoring information from the protected domain 911; and
- a monitoring unit 405 adapted to detect an isolation condition of the interconnecting node N11 within the protected domain 911 based on the first monitoring information, and to generate second monitoring information.

The interface 401, 402 of the interconnecting node N11 is adapted to transmit the second monitoring information to the working path 922 of the protected domain 921 so that a failure in this working path 922 is detectable, e.g. by the far-end node N21 of the working path 922, based on the second monitoring information.

When an isolation condition of the interconnecting node N11 within the protected domain 911 is detected, the monitoring unit 405 is adapted to concurrently prevent the transmission of the second monitoring information and to start a transmission of alarm indication information to the working path 922 of the protected domain 921 for suppressing at the far-end node N21 an alarm reporting regarding a failure in the working path 922 of the protected domain 921. The meaning of prevention of transmission of monitoring information in different network environments has already been discussed in the previous paragraphs, in particular with reference to FIGS. 2 and 3 and will not be repeated here.

Further on and in addition to the interconnecting node N1 of the first embodiment, when an isolation condition of the interconnecting node N11 within the protected domain 911 is detected, the monitoring unit of said interconnecting node N11 is adapted to generate and start a transmission of modified second monitoring information to the working path 922 of the second protected domain 921. Said modified second monitoring information indicates, e.g. to the far-end node N21 of the working path 922, that a detected failure on the working path 922 is caused by fault propagation of a failure in the first protected domain 911.

Advantageously, the far-end node of the protected domain 921, i.e. the interconnecting node N21, may understand when protection switching within the protected domain 921 is triggered by a failure on the working path 922 within that protection domain 921 or by the cascading actions triggered by a fault within an upstream protected domain like the protected domain 911.

Advantageously, when the isolation condition of the interconnecting node N11 within the first protected domain 911 is detected, the monitoring unit of the interconnecting node N11 is also adapted to concurrently start the transmission of the modified second monitoring information to the working path 922 of the second protected domain 921, and start the transmission of alarm indication information to the working path 922 of the second protected domain 921. Transmission of alarm indication is optional and is done for backward compatibility purposes. In this realization, the modified monitoring information has also the function of the alarm indication information. Consequently, transmission of a dedicated frame for the alarm indication information, such as transmission of an AIS frame, for instance in the Ethernet case, may be avoided.

According to the present disclosure, the interconnecting node N21, which corresponds to the far-end node of the working path 922, is adapted to:
- receive first monitoring information from the protected domain 921, and detect an isolation condition of the interconnecting node N21 within the protected domain 921 based on the first monitoring information, similarly to the first embodiment; and
- receive modified first monitoring information from the protected domain 921.

The first monitoring information received by the interconnecting node N21 advantageously corresponds to the second monitoring information transmitted by the interconnecting node N11. The modified first monitoring information received by the interconnecting node N21 advantageously corresponds to the modified second monitoring information transmitted by the interconnecting node N11. More specifically, the first monitoring information received by the interconnecting node N21 is the second monitoring information generated by the interconnecting node N11 and transmitted from the interconnecting node N11 to the interconnecting node N21.

Particularly, the interconnecting node N21 then may distinguish between the reception of the first monitoring information and of the modified first monitoring information. Accordingly, when the modified first monitoring information is received, the interconnecting node N21 detects that a failure is located in a working path located upstream of the working path 922 to which it is connected. Also, the interconnecting node N21 detects an isolation condition of the interconnecting node N21 within the protected domain 921 based on the received first monitoring information. In other words, the interconnecting node N21 detects a failure located in the working path 922 of the protected domain 921 based on the received first monitoring information.

On the one hand, the transmission of the modified second monitoring information by the interconnecting node N11, i.e. the reception of the modified first monitoring information by the interconnecting node N21, is illustrated by FIG. 9.

Figure 10:
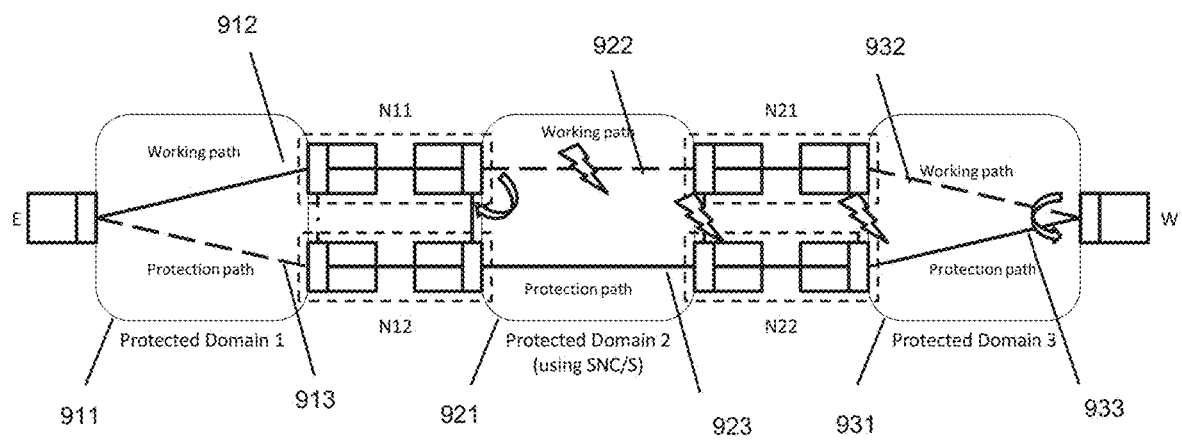
FIG. 10 shows a second scenario of a system according to the second embodiment of the present disclosure.

On the other hand, FIG. 10 illustrates the transmission of the second monitoring information by the interconnecting node N11, i.e. the reception of the first monitoring information by the interconnecting node N21. In the particular scenario of FIG. 10, there is indeed a failure of the working path 922 of the protected domain 921. The interconnecting node N21 then detects such a failure located in the working path 922 of the protected domain 921 based on the received first monitoring information.

In the scenario of FIG. 10 regarding a failure within protected domain 921, interconnecting node N21 detects that it is isolated within protected domain 921, and prepares transmission of alarm indication information. In packet based network environments, such as Ethernet networks the interconnecting nodes inserts AIS frames and switches off CCM frame generation on the working path 932 within protected domain 931 triggering protection switching action within protected domain 931. Node N22 would think that node N21 is isolated within protected domain 931 based on the received SF(1,1) from node W and the failure state of the vertical path within protected subnetwork 931 and therefore will generated SF(1,1) on the protection path 923 within protected subnetwork 921. The SF(1,1) from node N22 will be received by node N11 (through node N12) which would trigger protection switching within protected subnetwork 921. Traffic forwarding is recovered through the E-N11-N12-N22-W path.

In the scenario of FIG. 9 regarding a failure within protected domain 911, interconnecting node N21 receives CCM frames with a different OpCode—i.e. receives the modified monitoring information, can understand that the working path within the protected domain 921 is healthy and therefore that protection switching within protected domain 921 needs to be triggered because of a cascading action caused by interconnected node isolation within an upstream protected domain.

In the failure scenario of FIG. 9, the interconnecting node N21 could either:

1) trigger protection switching within the protected domain 931, likewise in the failure scenario of FIG. 10, i.e. it could decide to cascade protection switching action towards protected domain 931 and recover traffic forwarding, or 2) do not take any action and cause traffic loss, i.e. it could decide not to cascade protection switching actions toward protected domain 931.

According to the first embodiment comprising transmitting alarm indication information, the interconnecting node N1 terminating the working path 112 should trigger protection switching at the far-end node W of the working path 122 when it detects that it is isolated in the adjacent protected subnetwork 111 and it cannot communicate with its peer interconnecting node N2.

The solution according to the first embodiment is that such an interconnecting node N1 should insert a set of OAM information elements, based on existing OAM standards, within the maintenance entity monitoring the working path that, when received by the far-end node (implementing existing SNC/S standard) would both trigger protection switching as well as suppress S203 alarm reporting, in a backward compatible way—i.e. without requiring changes to the existing implementation.

In OTN networks it is sufficient to insert within the OTN frame overhead the alarm indication information in form of TCM AIS information.

For Ethernet networks, it is advantageously proposed to concurrently:

stop S202 transmission of CCM frames on the maintenance entity monitoring the working path: this would be sufficient to trigger protection switching and selection of the protection path as the active one;

insert S202 alarm indication information in form of MS frames on the same maintenance entity: this will suppress S203 alarm reporting of dLOC at the far end node thus not triggering any unnecessary maintenance actions.

According to the second embodiment, in order to avoid cascading of protection switching across multiple protected domains, beyond just the two adjacent ones, the interconnecting node N11 should also transmit modified second monitoring information by e.g. inserting additional OAM information elements, not yet defined in existing OAM standards, within the maintenance entity monitoring the working path to allow the far-end node to understand when protection switching within the protected domain is triggered by a failure on the working path within that protection domain or by the cascading actions triggered by a fault within an upstream protected domain. The far-end node can use this information just for reporting/logging purposes or, if it is interconnected to another downstream protected domain, to decide whether or not to further cascade protection switching actions toward that downstream protected domain.

The reporting purpose means that the operator can monitor this condition either by reading a state or by receiving a secondary alarm/notification (i.e., not triggering any maintenance action). The logging purpose means that the interconnecting node can record this status in a log that the operator can read.

This new OAM information—the modified second monitoring information—is designed to be backward compatible, such that when received by a legacy node (i.e. nodes supporting existing SNC/S standard), it can be ignored (the legacy node will behave likewise in the first embodiment). There is no need to enable/disable this capability in the interconnection node depending on whether the far-end node supports it or not and therefore the operations are simplified and not error prone.

The additional features of the second embodiment are advantageous and may be implemented/standardized if is e.g. needed to log/report cascading actions, differently than other secondary fault conditions within the protected domain, and it is always desired to cascade protection switching across multiple domains even if not adjacent.

In OTN networks it is sufficient, in addition to insertion of TCM AIS information, to set within the OTN frame overhead one of the reserved bits, such that:

legacy interconnecting nodes (i.e., nodes supporting existing SNC/S standard) will ignore this bit and trigger protection switching, without raising any primary alarm, because of the received TCM AIS information (likewise in the first embodiment);

interconnecting nodes implementing the second embodiment can detect reception of TCM AIS and trigger protection switching, without raising any primary alarm—likewise in the first embodiment—and, detecting also that this new bit is set, they can report/log this information and/or decide whether or not to further cascade protection switching actions toward the downstream protected domain, if any.

In Ethernet networks, two options are possible. The first option is to set the reserved bits of the Ethernet AIS frames, such that:

legacy interconnecting nodes (i.e., nodes supporting existing SNC/S standard) will ignore this bit and suppress dLOC alarm reporting because of the received AIS frame (likewise in the first embodiment);

interconnecting nodes implementing the second embodiment can suppress dLOC alarm reporting (likewise in the first embodiment) and, detecting also that this new bit is set, they can report/log this information.

Due to the different rates of AIS and CCM, it is not worthwhile taking fast consequent action (i.e. decide whether or not to further cascade protection switching actions toward the downstream protected domain) using AIS information. This is in line with current Ethernet standards where reception of AIS frames does not trigger protection switching actions.

The second option in Ethernet networks consists in changing the value of the OpCode field in the transmitted CCM frames, instead of stopping their transmission:

legacy interconnecting nodes (i.e., nodes supporting existing SNC/S standard) will discard these unknown OAM frames and, since CCM frames are not received, also detect dLOC: protection switching is triggered and primary alarm reporting is suppressed by the reception of the AIS frames (likewise in the first embodiment);

interconnecting nodes implementing the second embodiment can detect reception of CCM frames with different OpCode and, in this case, should trigger protection switching without raising any alarm (likewise in the first embodiment) and they can also report/log this information and/or decide whether or not to further cascade protection switching actions toward the downstream protected domain, if any.

It is worth noting that legacy nodes cannot support DNI and therefore they do not need to further propagate protection switching actions toward subsequent protected domain.

FIG. 4 shows an interconnecting node according to an embodiment of the present disclosure.

The interconnecting node 400 comprises at least one interface 401, 402 adapted to receive first monitoring information from the first protected domain, and particularly from a working path 412 of the first protected domain.

The interconnecting node 400 comprises a monitoring unit 405 adapted to detect an isolation condition of the interconnecting node within the first protected domain based on the first monitoring information, and to generate second monitoring information.

The interface 401, 402 is adapted to transmit the second monitoring information to the working path 422 of the second protected domain so that a failure in the working path 422 of the second protected domain is detectable based on the second monitoring information at a far-end node of the working path 422.

When an isolation condition of the interconnecting node within the first protected domain is detected, the monitoring unit 405 is adapted to concurrently prevent the transmission of the second monitoring information and to start a transmission of alarm indication information to the working path 422 of the second protected domain for suppressing at the far-end node an alarm reporting regarding a failure in the working path 422 of the second protected domain.

Particularly, the interface 401, 402 may comprise two distinct interfaces 401, 402 for respectively receiving the first monitoring information from the working path 412 of the first protected domain, and transmitting the second monitoring information to the working path 422 of the second protected domain.

A possible implementation for the interconnecting node N1 is described in FIG. 4 as an example. Said FIG. 4 shows the high level block diagram for such a possible implementation of an interconnecting node 400 of interconnecting node N1.

In this implementation, it is assumed that the interconnecting node N1, 400 sends/receives traffic to/from the two working paths 412, 422 and vertical paths 414, 424 toward three line interfaces 401, 402, 403: one interface 401 for the working path 412 within the first protected domain 111, one interface 402 for the working path 422 within the first protected domain 121 and one interface 403 for both the vertical paths 414, 424. The two working paths 412, 422 and the vertical paths 414, 424 respectively correspond to the working paths 112, 122 and the vertical paths 114, 124 of FIG. 1.

The traffic for these three interfaces is processed by a processing unit 404. The processing unit 404 will process the traffic—e.g., Ethernet frames—received from the line, as specified in relevant standards, understand to which connection the traffic belongs to and decide how it has to be further processed. The traffic to be forwarded will be passed to a switching unit 406, together with the information needed to properly forward it toward the egress.

The traffic received from the line can contain OAM information—e.g., Ethernet OAM frames or OTN frame overhead bytes—to be processed locally by the node: this information will be sent to an OAM unit 405, together with the information identifying the associated maintenance entity. The OAM unit 405 is an example of the monitoring unit according to the present disclosure.

The processing unit 404 is also responsible to properly formatting the egress traffic, received from the switching unit 406, for being transmitted toward the line. The processing unit 404 can also receive OAM information from the OAM unit 405 to be forwarded either toward the line—together with the traffic received from the switching unit 406—or towards the switching unit 406—together with the traffic received from the line.

Figure 5:
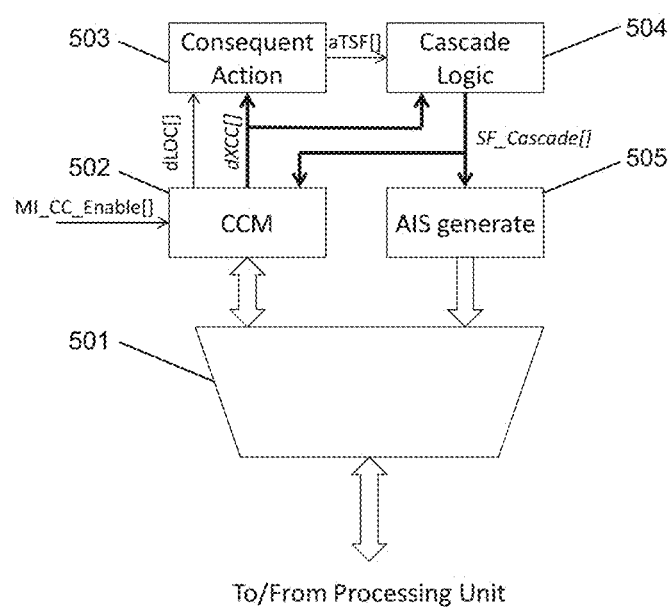
FIG. 5 shows a monitoring unit of an interconnecting node according to an embodiment of the present disclosure.

FIG. 5 shows a monitoring unit of an interconnecting node according to an embodiment of the present disclosure, and particularly shows a possible implementation of a monitoring unit 500 of the OAM unit 405 of FIG. 4. FIG. 5 depicts monitoring unit 500 implemented in a packet based environment, such as an Ethernet network. A monitoring unit implemented in an interconnecting node of a network different than Ethernet, such as for instance an OTN network, may include functional blocks different than those illustrated in FIG. 5. As an example a monitoring unit for an OTN network may include a functional block for processing OAM information in the received overhead of an OTN frame or to request the Processing Unit to set the overhead of an OTN frame information describing the type of failure with alarm indication information. Such functional block may replace the CCM and AIS generate blocks of the monitoring unit 500 of FIG. 5.

The OAM unit 500 is decomposed in different functional blocks implementing different OAM functions. The OAM unit comprises a mux/demux unit 501 that multiplexes the OAM information generated by the OAM functional blocks toward the processing unit 404 and demultiplexes the OAM information received from the processing unit 404 toward the OAM functional block(s). In case of Ethernet, the demultiplexing of received OAM frames toward different OAM processing units is based on the OpCode field in the Ethernet OAM PDU, as defined in ITU-T Recommendation G.8013/Y.1731 (August 2015), "OAM functions and mechanisms for Ethernet-based networks" (in particular chapter 9).

The OAM unit 500 comprises a CCM block 502 that generates CCM frames and processes received CCM frames on a given maintenance entity, implementing the CCM state machines defined in ITU-T Recommendation G.8021 (April 2015), section 8.1.7, "Characteristics of Ethernet transport network equipment functional blocks". The CCM block 502 supports many instances of these state machines, one for each maintenance entity. It also provides, for each maintenance entity, dLOC (and other CCM-related defect) information to a Consequent Action process, as defined in ITU-T Recommendation G.8021 (April 2015), chapter 6.2. The Consequent Action process is implemented in a Consequent Action block 503 shown in FIG. 5.

Figure 6:
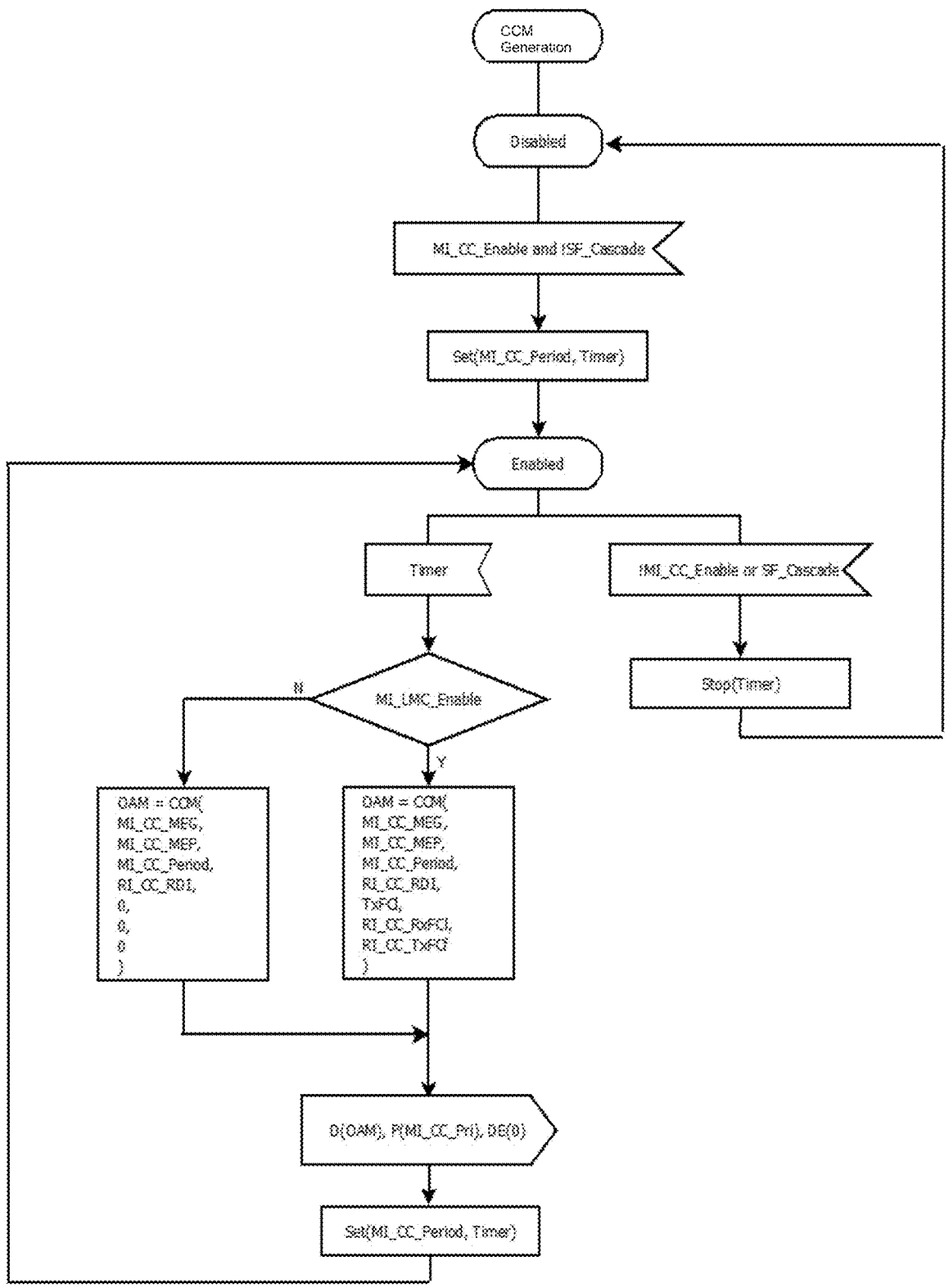
FIG. 6 shows a state machine for transmitting the second monitoring information by an interconnecting node according to an embodiment of the present disclosure.

FIG. 6 shows a state machine for transmitting the second monitoring information by an interconnecting node according to an embodiment of the present disclosure. Particularly, FIG. 6 defines the state machine of the CCM generation process, i.e. of the CCM block 502 of FIG. 5.

The generation of the CCM frames on each maintenance entity is started/stopped based on the operator's configuration, which corresponds to the input MI_CC_Enable, as defined in ITU-T Recommendation G.8021 (April 2015), section 8.1.7.2. In order to support cascading of protection switching actions, the state machine should also consider a new input, which is referred to as SF_Cascade in FIGS. 5 and 6.

For the first embodiment, the CCM block should start/stop CCM generation based on the "logical and" between MI_CC_Enable and the SF_Cascade signal as shown in FIG. 6.

For the second embodiment, the state machine is almost the same as in FIG. 8-17 of ITU-T Recommendation G.8021 (April 2015) but the CCM( ) function will take also the SF_Cascade input parameter:
if the SF_Cascade is false, the generated CCM frame will have the OpCode set to 1 (existing standard OpCode value defined for CCM frames);
if the SF_Cascade is true, the generated CCM frame will have the OpCode set to one of the value reserved for future standardization (e.g., value 39).

Figures 7, 8:
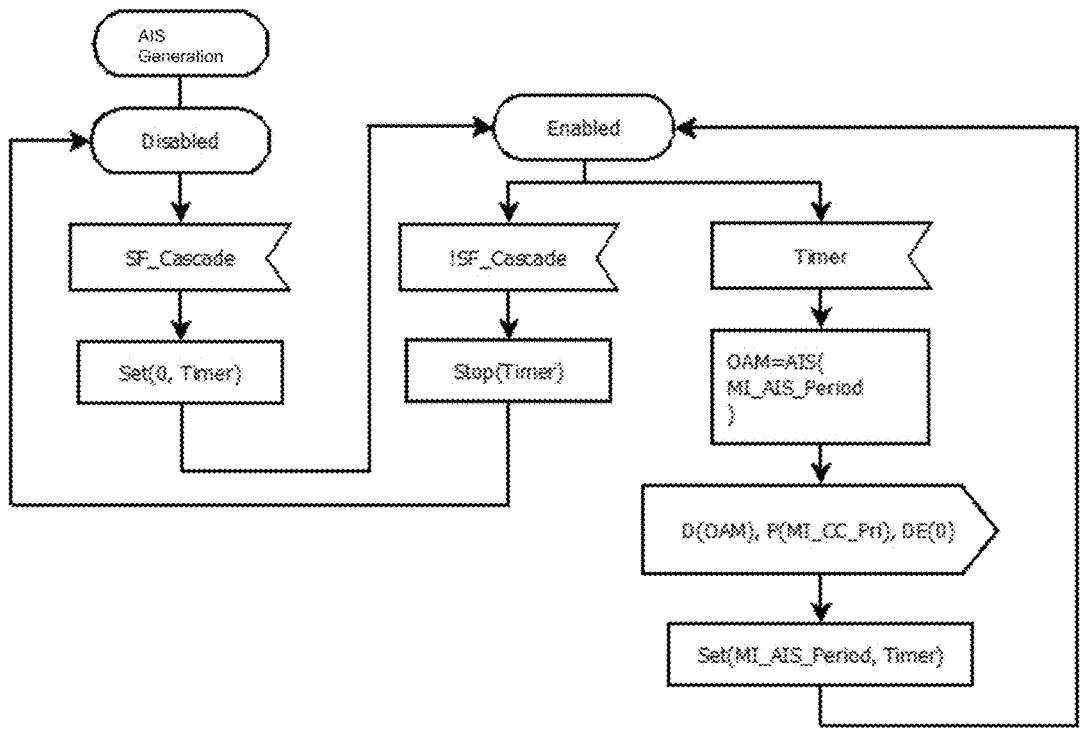
FIG. 7 shows a possible implementation of a protocol data unit (PDU) of the modified second monitoring information according to an embodiment of the present disclosure.
FIG. 8 shows a state machine for transmitting the alarm indication information by an interconnecting node according to an embodiment of the present disclosure.

Alternatively, if SF_Cascade is true, a VSM or an EXM frame can be generated instead of CCM. This VSM PDU would have most of the fields set to the same values of the corresponding field in the CCM frame. As shown in FIG. 7, the differences are:
OpCode is set 51 (existing standard OpCode value defined for VSM frames);
OUI is set to the OUI value assigned to the vendor implementing this solution;
SubOpCode is set to any value the vendor choses to identify this "modified" CCM frames (e.g., value 1);
TLV Offset is set to 74 (i.e., the value of the TLV Offset defined for CCM plus 4, since there are 4 additional bytes before the TLV area starts to carry the OUI and SubOpCode fields).

In order to insert also AIS frames, a new "AIS generation" process or CMC block 502 should be added to generate AIS frames on a given maintenance entity when requested by the SF_cascad signal. The state machine of the "AIS generation" process is similar to the state machine of the "AIS insert" process, as defined in FIGS. 8-9 of ITU-T Recommendation G.8021 (April 2015). The difference would be:
AIS frames are inserted within a given maintenance entity and not within its client layer (or sub-layer) connections;
AIS frame generation is triggered by SF_cascade signal rather than by the aAIS consequent action.

An example of the resulting state machine is shown in FIG. 8.

According to the second embodiment, one of the Reserved bits (e.g., bit 8) of the Flag field in the AIS frame will be set to 1. The format of the AIS Flag field is shown in FIGS. 9.7-2 of ITU-T Recommendation G.8013/Y.1731 (August 2015).

In order to trigger protection switching actions between adjacent protected subnetworks a new "Cascade Logic" block 504 is implemented in the monitoring unit 500 of FIG. 5. The "Cascade Logic" block 504 receives information about the signal fail status of a given maintenance entity via an aTSF signal generated, as per standard implementation, by the "Consequent Action" block 503 and trigger protection switching cascading action, via the "SF_Cascade" toward the CCM and "AIS Generate" blocks 502 and 505.

The "Cascade Logic" block is configured, for each SNC/S DNI protected domain, with the following information:
The maintenance entity monitoring the working and vertical paths for each SNC/S protected domain: for example, it is configured with the information about which maintenance entities are monitoring the working and protection paths of the SNC/S protected domains 1 and 2;
The pair of adjacent SNC/S protected domains: for example that protected domains 1 and 2 are adjacent.
This block is able to detect whether the node N1 is isolated within a protected domain based on the aTSF information for the associated maintenance entities: when aTSF is asserted for both maintenance entities, the node is isolated.

For example, when the aTSF for the maintenance entities monitoring the working path 112 W1 and vertical path 114 V1 of SNC/S protected domain 111 is asserted, node N1 is considered isolated within protected domain 111 PD1:

$N1\_isolation[PD1]=aTSF[W1]$ and $aTSF[V1]$

When node isolation within a given SNC/S domain is detected, the "Cascade Logic" block is responsible to trigger protection switching in the adjacent protected domain by asseting the "SF_Cascade" signal, toward the CCM and the AIS generated blocks, for the maintenance entity monitoring the working path.

For example when N1 is considered isolated within protected domain 111, the block knows, by configuration, that the adjacent protected domain is protected domain 121 and it also knows, by configuration, which is the maintenance entity associated with the working path 122 W2 of SNC/S protected domain 121 PD2:

$Adjacent\_PD[PD1]=PD2$ $Working\_Path[PD2]=W2$

In order to support the second embodiment, the CCM block should be updated to accept both standard CCMs as well as modified CCM. As a consequence, dLOC would not be triggered when standard CCMs are not received but modified CCM are received instead. A new defect "dXCC" should also be detected and reported to both the consequent action block and the "Cascade Logic", when modified CCMs are received instead of standard CCMs.

The defect correlation block should be modified to generate aTSF[ ] also in case dXCC is received: this information will also be used by the protection switching process (not shown) to trigger protection switching.

The "Cascade Logic", if configured not to cascade protection switching actions across multiple domain (ML_SF_Cascade_Multi) should not consider the node isolated in case dXCC is reported for the maintenance entity:

$N1\_isolation[PD1]=aTSF[W1]$ and $aTSF[V1]$ and (not $(dXCC[W1])$) and (not ML_SF_Cascade_Multi))).

In TDM network environments, such as for instance in an OTN network, the alarm indication information and the monitoring information is embedded in the OTN frame and specifically in the ODUk overhead of an OTN frame as defined for instance in ITU-T Recommendation G.709/Y.1331 (February 2012), section 15.8.1 FIGS. 15-12 to 15-14. Accordingly, the monitoring and AIS information for the working path are sent within the TCM # i byte associated with the TCM used for monitoring the working path. Specifically, referring to the TCM # i overhead format (see for instance FIGS. 15-14 for instance in ITU-T Recommendation G.709/Y.1331 (February 2012), section 15.8.1) the monitoring and AIS information are sent in the STAT bits of the TCM # i overhead format. The following table 1 indicates the STAT bits of the TCM format (see also table 15-5 for instance in ITU-T Recommendation G.709/11331 (February 2012), section 15.8.2.2.5):

TABLE 1

ODUk TCM status interpretation

| TCM byte 3 bits 6 7 8 | Status |
|---|---|
| 0 0 0 | No source TC |
| 0 0 1 | In use without IAE |
| 0 1 0 | In use with IAE |
| 0 1 1 | Reserved for future international standardization |
| 1 0 0 | Reserved for future international standardization |
| 1 0 1 | Maintenance signal: ODUk-LCK |
| 1 1 0 | Maintenance signal: ODUk-OCI |
| 1 1 1 | Maintenance signal: ODUk-AIS |

According to ITU-T Recommendation G.709/11331 (February 2012), section 15.8.2.2.5, monitoring information is inserted by setting the STA bits to either "001" to indicate that there is no incoming alignment error (IAE), or to "010" to indicate that there is an incoming alignment error. Setting the STA bits to a value different than "001" or "010" can be seen as stopping the insertion of the monitoring information.

According to the disclosure, when an interconnecting node, for instance interconnecting node N1 in FIGS. 1 to 3 is isolated, the STA bits are set to "111" instead, corresponding to the status Maintenance signal: ODUk-AIS. Setting of the STA bits may be done by the TC-CMEP ingress point.

In OTN network environments, modified monitoring information may be transmitted using the reserved bits in the OTUk overhead (RES). The ODUk overhead of the OTN frame is illustrated in in ITU-T Recommendation G.709/Y.1331 (February 2012), section 15.8.1 FIGS. 15-12 and the reserved bits are described in section 15.8.2.7. As an example, the reserved bits may be two bytes located in row 1, columns 13 and 14 of the OTUk overhead. Such a choice would assure backward compatibility.

Alternatively, the reserved codepoints within the TCM bytes may be used. The reserved codepoints may be the bits "011" or "100" in table 1 above. In a further alternative, the APS/PCC bites in the ODUk frame.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. Interconnecting node for interconnecting a first protected domain and a second protected domain, the second protected domain comprising a working path and a protection path for linear protection in a network for traffic forwarding between two end-nodes, wherein the first or second protected domain represents a protected portion of an end-to-end connection, and wherein the interconnecting node comprises a processor and a memory, the memory is configured to store a program, and the processor invokes the program in the memory and is configured to:
   receive a first monitoring information from the first protected domain, and
   detect an isolation condition of the interconnecting node within the first protected domain based on the first monitoring information, and generate a second monitoring information, and
   transmit the second monitoring information over the working path of the second protected domain so that a failure in the working path is detectable based on the second monitoring information at a far-end node of the working path, and
   start a transmission of alarm indication information (AIS) over the working path of the second protected domain for suppressing at the far-end node an alarm reporting regarding a failure in the working path of the second protected domain, when the isolation condition of the interconnecting node within the first protected domain is detected.

2. The interconnecting node according to claim 1, wherein the processor is further configured to:
   prevent the transmission of the second monitoring information to the working path of the second protected domain when the isolation condition of the interconnecting node within the first protected domain is detected.

3. The interconnecting node according to claim 1,
   wherein, the first protected domain comprises a given working path and a given protection path for linear protection; and
   the processor is configured to:
      detect that the interconnecting node is isolated within the first protected domain if a failure in the given working path and a failure of a vertical path are detected, the vertical path connecting the interconnecting node with a second interconnecting node in the first protected domain.

4. The interconnecting node according to claim 2,
   wherein, the first protected domain comprises a given working path and a given protection path for linear protection; and
   the processor is configured to:
   detect that the interconnecting node is isolated within the first protected domain if a failure in the given working path and a failure of a vertical path are detected, the vertical path connecting the interconnecting node with a second interconnecting node in the first protected domain.

5. The interconnecting node according to claim 1,
   wherein the far-end node of the second working path is one of the two end-nodes.

6. The interconnecting node according to claim 1,
   wherein, the processor is further configured to:
   when an isolation condition of the interconnecting node within the first protected domain is detected,
   generate and start a transmission of modified second monitoring information to the working path of the second protected domain, said modified second monitoring information indicating that a detected failure on the working path is caused by fault propagation of a failure in the first protected domain.

7. The interconnecting node according to claim 2,
   wherein, the processor is further configured to:
   when an isolation condition of the interconnecting node within the first protected domain is detected,
   generate and start a transmission of modified second monitoring information to the working path of the second protected domain, said modified second monitoring information indicating that a detected failure on the working path is caused by fault propagation of a failure in the first protected domain.

8. The interconnecting node according to claim 6, wherein, the processor is further configured to:
when the isolation condition of the interconnecting node within the first protected domain is detected,
concurrently start the transmission of the modified second monitoring information to the working path of the second protected domain, and start the transmission of AIS to the working path of the second protected domain.

9. The interconnecting node according to claim 1, wherein the far-end node of the second working path is connected to a further protected domain used for traffic forwarding between the two end-nodes.

10. The interconnecting node according to claim 6, wherein the processor is further configured to:
receive modified first monitoring information from the first protected domain, and
distinguish between a reception of the first monitoring information and of the modified first monitoring information, and
detect that a failure is located in a further working path interconnected with the first protected domain, when the modified first monitoring information is received.

11. The interconnecting node according to claim 1, wherein the network is a packet network, preferably an Ethernet network or a network based on Multi-Protocol Label Switching Transport Profile (MPLS-TP),
the first monitoring information and second monitoring information is respectively transmitted by means of Continuity Check Message (CCM) Operations, Administration and Maintenance (OAM) packets, and
the alarm indication information, is transmitted as an Alarm Indication Signal (AIS) OAM packet.

12. The interconnecting node according to claim 2, wherein the network is a packet network, preferably an Ethernet network or a network based on Multi-Protocol Label Switching Transport Profile (MPLS-TP)
the first monitoring information and second monitoring information are respectively transmitted by means of Continuity Check Message (CCM) Operations, Administration and Maintenance (OAM) packets, and
the alarm indication information, is transmitted as an Alarm Indication Signal (AIS) OAM packet.

13. The interconnecting node according to claim 1, wherein the network is a Time-Division Multiplexing (TDM) network, preferably Optical Transport Network (OTN) or Synchronous Digital Hierarchy (SDH) and
the first monitoring information, the second monitoring information and the alarm indication information are respectively transmitted by means of specific bytes in an overhead of a TDM frame.

14. The interconnecting node according to claim 2, wherein the network is a Time-Division Multiplexing (TDM) network, preferably Optical Transport Network (OTN) or Synchronous Digital Hierarchy (SDH) and
the first monitoring information, the second monitoring information and the alarm indication information are respectively transmitted by means of specific bytes in an overhead of a TDM frame.

15. Method for interconnecting via an interconnecting node, a first protected domain and a second protected domain, the first or second protected domain representing a protected portion of an end-to-end connection, and the second protected domain comprising a working path and a protection path for linear protection in a network for traffic forwarding between two end-nodes, wherein the method comprises:
receiving a first monitoring information from the first protected domain; and
detecting an isolation condition of the interconnecting node within the first protected domain based on the first monitoring information, and generating a second monitoring information, wherein
transmitting the second monitoring information to the working path of the second protected domain, so that a failure in the working path is detectable based on the second monitoring information at a far-end node of the working path, and
starting a transmission of alarm indication information to the working path of the second protected domain for suppressing at the far-end node an alarm reporting regarding a failure in the working path of the second protected domain, when the isolation condition of the interconnecting node within the first protected domain is detected.

16. Computer program having a non-transitory program code for performing the method according to claim 15, wherein the computer program runs on a computing device.

17. The method according to claim 15, wherein the method further comprises:
stopping the transmission of the second monitoring information over the working path of the second protected domain and starting the transmission of AIS over the working path, when the isolation condition of the interconnecting node within the first protected domain is detected.

* * * * *